(12) United States Patent
Scollard

(10) Patent No.: US 6,705,010 B1
(45) Date of Patent: Mar. 16, 2004

(54) METHOD AND APPARATUS FOR REDUCING THE FORCE REQUIRED TO INSERT A SEAL IN A CAVITY

(75) Inventor: Joseph E. Scollard, Suffolk, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/340,108

(22) Filed: Jun. 25, 1999

(51) Int. Cl.[7] .................................................. B23P 6/00
(52) U.S. Cl. ........................ 29/888.011; 451/32; 451/51
(58) Field of Search ........................ 29/888.01, 888.011, 29/525; 451/32, 35, 34, 51, 85, 86, 326, 61; 123/470

(56) References Cited

U.S. PATENT DOCUMENTS

| 3,965,620 | A | * | 6/1976 | Dreher | 451/328 |
|---|---|---|---|---|---|
| 4,709,507 | A | * | 12/1987 | Musschoot | 451/113 |
| 4,712,333 | A | * | 12/1987 | Lofton | 451/330 |
| 5,018,499 | A | * | 5/1991 | Usui | 123/470 |
| 5,109,633 | A | * | 5/1992 | Durnil | 451/326 |
| 5,140,783 | A | * | 8/1992 | Hoffman | 451/32 |
| 5,676,588 | A | * | 10/1997 | Frederick et al. | 451/86 |
| 5,724,946 | A | * | 3/1998 | Franchitto | 123/470 |
| 5,829,131 | A | * | 11/1998 | DeSloover et al. | 451/32 |
| 5,873,770 | A | * | 2/1999 | Hashimoto | 451/32 |
| 6,165,059 | A | * | 12/2000 | Park | 451/330 |

* cited by examiner

Primary Examiner—Charles T. Jordan
Assistant Examiner—T. Nguyen

(57) ABSTRACT

A method of reducing the force required to insert an elastomeric seal in a cavity of a metallic member includes tumbling the member in a tumbling machine with media to decrease the surface roughness of the member. Preferably, the tumbling step includes decreasing the surface roughness of the metallic member at least a portion of the member defining an entrance to the cavity. The method is particularly useful for reducing the force required to insert fuel injectors having top O-rings into fuel rail cups.

22 Claims, 1 Drawing Sheet

METHOD AND APPARATUS FOR REDUCING THE FORCE REQUIRED TO INSERT A SEAL IN A CAVITY

BACKGROUND OF THE INVENTION

The invention relates in general to reducing the force required to insert an elastomeric seal in a cavity of a metallic member and in particular to reducing the force required to insert a fuel injector in a fuel rail cup.

A known method for making fuel rail cups is by stamping a strip of metal. The cups only (no tumbling media) are then typically tumbled in a tumbling machine to deburr the cups and remove any cleaning solution. The cups are then attached to a fuel rail by, for example, brazing. The fuel rail with cups attached is dipped in a corrosion protection solution such as zinc-iron. The corrosion protection solution attaches to the fuel rail and cups by an electrochemical plating process. The fuel injectors are then inserted in the fuel rail cups either manually or by a machine.

Problems may arise when inserting the injectors in the fuel rail cups. The injector includes a top O-ring, which provides a seal inside the cup. If the injectors are inserted manually, great effort may be required to force the O-ring inside the cup. If the injectors are inserted automatically by a machine, it is possible that the O-ring may be damaged during the insertion process thereby degrading the seal in the cup and resulting in fuel leakage. Further, if the force required to insert the injector is too great, it is possible that the machine will simply stop the insertion operation for that injector and cup.

SUMMARY OF THE INVENTION

The present invention provides a method of reducing the force required to insert an elastomeric seal in a cavity of a metallic member comprising tumbling the metallic member in a tumbling machine with media to decrease surface roughness of the metallic member.

Preferably, the tumbling step includes decreasing surface roughness of the metallic member at least a portion of the member defining an entrance to the cavity. In one embodiment, a number of metallic members is about three times greater than a number of media. The media comprise generally cylindrical pieces having ends angled at about 45 degrees.

The present invention also provides a method of reducing the force required to insert fuel injectors in fuel rail cups comprising tumbling the fuel rail cups in a tumbling machine with media to decrease surface roughness of the cups. Preferably, the tumbling step includes decreasing surface roughness of the cups at least portions of the cups defining entrances to the cups. The method may also comprise inserting a fuel injector having a top O-ring into a fuel rail cup.

In one embodiment, the tumbling step includes tumbling a number of cups that is about three times greater than a number of media. Preferably, the media comprise generally cylindrical pieces having ends angled at about 45 degrees. More preferably, the media are about 0.25 inches long and about 3 millimeters in diameter.

In a preferred embodiment, the surface roughness is decreased from about 0.85 Ra micrometers to about 0.20 Ra micrometers.

The present invention also provides an apparatus comprising a fuel rail cup, the fuel rail cup including an entrance portion and an interior portion, a surface roughness of the entrance portion being less than a surface roughness of the interior portion. Preferably, the surface roughness of the entrance portion is about 0.20 Ra micrometers and the surface roughness of the interior portion is about 0.85 Ra micrometers.

The apparatus may further comprise a fuel injector having a top O-ring, the fuel injector being inserted in the interior portion of the cup. More preferably, the apparatus further comprises a fuel rail, the cup being attached to the fuel rail.

Further objects, features and advantages of the invention will become apparent from the following detailed description taken in conjunction with the drawing.

DETAILED DESCRIPTION OF THE PREFERRED EMBODIMENT

In a broad aspect, one embodiment is a method of reducing the force required to insert a seal in a cavity of a metallic member. The seal is typically an elastomeric seal, which is compressed when inserted in the cavity of the metallic member. The metallic member may be any type of apparatus that includes a cavity or opening wherein the seal is inserted.

According to this embodiment, the metallic member is tumbled in a tumbling machine with media to decrease the surface roughness of the member. Typically, large numbers, for example, thousands of the members are tumbled together with the media at the same time. An example of a suitable tumbling machine is a Model VF-7 tumbling machine manufactured by Vibra Finishing Systems.

The tumbling decreases the surface roughness of the metallic member. The surface roughness of the external surfaces of the member is reduced. The surface roughness of the internal surfaces of the cavity of the member may or may not be affected. However, it is important to decrease the surface roughness of the metallic member at least that portion of the member that defines an entrance to the cavity. With a decreased surface roughness at the entrance to the cavity, it is much easier to begin inserting an elastomeric seal into the cavity. The area of decreased surface roughness at the entrance to the cavity helps to get the seal started into the cavity. Once the seal is started into the cavity, less force is required to fully insert the seal in the cavity.

Preferably, the number of members that are tumbled together is about three times greater than the number of media that are used. The media may have a variety of shapes and sizes, such as spherical, cylindrical, etc. Preferably, the media are generally cylindrical pieces having their ends angled at about 45 degrees. The media may be made of, for example, steel.

Figure 1:
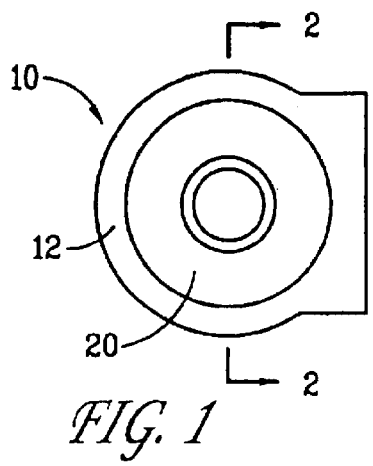
FIG. 1 is a bottom view of a fuel rail cup.
Figure 2:
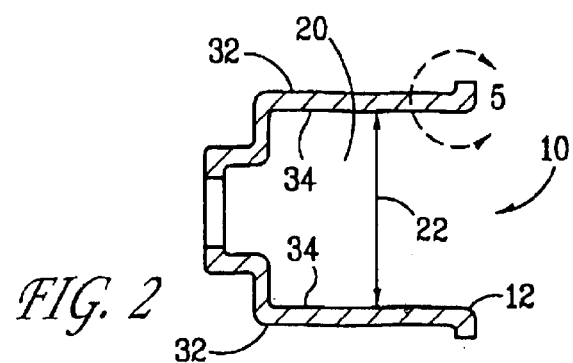
FIG. 2 is a cross-sectional view of a fuel rail cup taken along the line 2—2 in FIG. 1.
Figure 3:
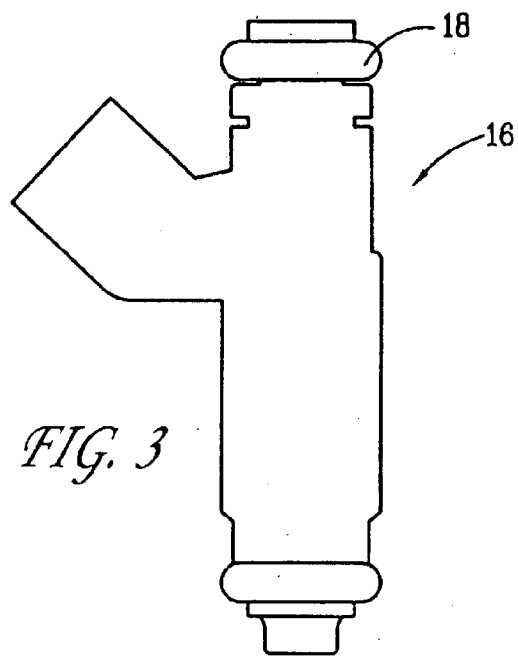
FIG. 3 is a schematic side view of a fuel injector.

Another embodiment is a method of reducing the force required to insert fuel injectors into fuel rail cups. FIG. 1 is a bottom view of a fuel rail cup 10 and FIG. 2 is a cross-sectional view of a fuel rail cup 10 taken along the line 2—2 in FIG. 1. FIG. 3 is a schematic side view of a fuel injector 16 having a top O-ring 18.

Figure 4:
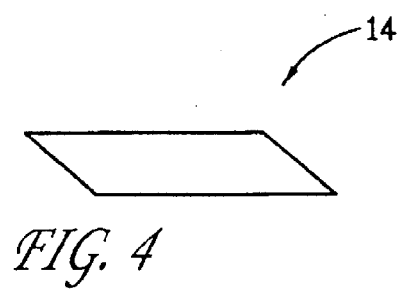
FIG. 4 is a side view of a tumbling medium.
Figure 5:
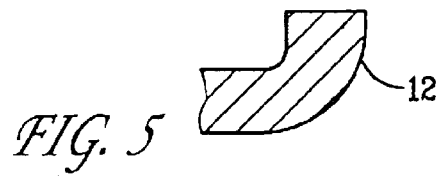
FIG. 5 is an enlarged view of the area 5 in FIG. 2.

According to this embodiment, a fuel rail cup 10 is made by stamping a strip of steel. The cup is then formed using dies. The cups 10 are tumbled with a media 14 (FIG. 4) in a tumbling machine, such as the machine described above. Tumbling deburrs the cups, removes any cleaning solution and decreases the surface roughness of the cups.

Preferably, the ratio of the number of cups 10 in the tumbling machine to the number of media 14 in the tumbling machine is about three to one. More preferably, the number of cups 10 is about 15,000 and the number of media 14 is about 5000. In a preferred embodiment, the cups and media are tumbled together for about an hour.

The media are made of a metallic material, preferably steel. The media may have a variety of shapes and sizes, such as spherical, cylindrical, etc. Preferably, the media are solid, generally cylindrical pieces 14 having their ends angled at about 45 degrees. More preferably, the media are about 0.25 inches long and about 3 millimeters in diameter.

The tumbling process decreases the surface roughness of the cups 10. Preferably, the tumbling process decreases the surface roughness of the cups from about 0.85 Ra micrometers to about 0.20 Ra micrometers. The surface roughness of the external surfaces 32 of the cups 10 is reduced. The surface roughness of the internal surfaces 34 of the cups may or may not be affected. However, it is important to decrease the surface roughness of the cups at least those portions 12 of the cups that define entrances to the cups. With a decreased surface roughness at the entrance 12 to the cup, it is much easier to begin inserting a fuel injector 16 having a top O-ring 18 into the cup 10. The area of decreased surface roughness at the entrance 12 to the cup helps to get the O-ring 18 started into the cup. Once the O-ring 18 is started into the cup, less force is required to fully insert the O-ring 18 and injector 16 into the cup 10.

After the cups are tumbled, the cups are attached to a fuel rail by, for example, brazing. The fuel rail with cups attached is dipped in a corrosion protection solution such as zinc-iron. The corrosion protection solution attaches to the fuel rail and cups by an electrochemical plating process. The thickness of the corrosion protection plating is about 8 microns. The electrochemical plating process does not appreciably affect the surface roughness values obtained by tumbling. The fuel injectors are then inserted in the fuel rail cups either manually or by a machine. A clip (not shown) may be used to orient the injector with respect to the fuel rail. Other means of orientation are also possible.

Figure 6:
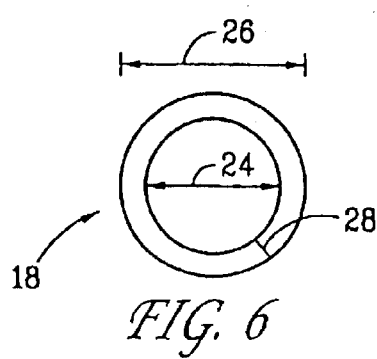
FIG. 6 is a top view of a top O-ring of the fuel injector of FIG. 3.
Figure 7:
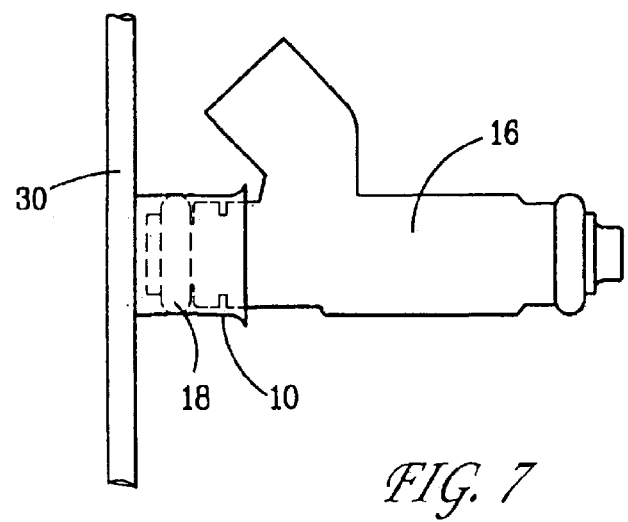
FIG. 7 is a schematic side view of a fuel injector inserted in a fuel rail cup that is attached to a fuel rail.

FIG. 6 is a top view of a top O-ring 18 of the fuel injector 16 of FIG. 3. FIG. 7 is a schematic side view of a fuel injector 16 with top O-ring 18 inserted in a fuel rail cup 10 that is attached to a fuel rail 30.

In one embodiment, after the electrochemical plating process, the inside diameter 22 of the cup 10 is about 13.44 mm. The inside diameter 24 of the O-ring 18 is about 7.53 mm and the width 28 of the O-ring 18 is about 3.53 mm. Therefore, the outside diameter 26 of the O-ring is about 14.59 mm. Because the O-ring 18 must be compressed to be inserted in the cup 10, the area of decreased surface roughness at the entrance 12 to the cup helps to reduce the force required to insert the O-ring 18 and injector 16 into the cup 10.

Prior to the present invention, injector insertion forces were about 46.04 pounds force. After tumbling the cups with media according to the embodiment of the preceding paragraph, the injector insertion force is only 23.42 pounds force. Thus, this embodiment reduces the force required to insert the injector in the cup by about 50 percent.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of reducing the force required to insert fuel injectors in cavities of fuel rail cups comprising:

tumbling the fuel rail cups in a tumbling machine with media to decrease surface roughness of at least portions defining entrances to the cavities of the fuel rail cups from a surface roughness of the fuel rail cups prior to tumbling of the fuel rail cups so that a force required to insert a fuel injector into each fuel rail cup is reduced by at least approximately 50 percent.

2. The method of claim 1 wherein the tumbling step includes tumbling a number of cups that is about three times greater than the number of media.

3. The method of claim 2 wherein the number of cups is about 15,000 and the number of media is about 5000.

4. The method of claim 1 wherein the media comprises generally cylindrical pieces having ends angled at about 45 degrees.

5. The method of claim 1 wherein the cups are tumbled for about one hour.

6. The method of claim 4 wherein the media are about 0.25 inches long.

7. The method of claim 6 wherein the media are about 3 millimeters in diameter.

8. The method of claim 7 wherein the media are made of steel and the cups are made of steel.

9. The method of claim 1 wherein the surface roughness is decreased from about 0.85 Ra micrometers to about 0.2 Ra micrometers.

10. The method of claim 9 wherein an inside diameter of the cups is about 13.44 millimeters.

11. The method of claim 1 further comprising inserting a fuel injector having a top O-ring into a fuel rail cup.

12. A method of reducing a force required to insert an elastomeric member of a fuel injector in a cavity of a metallic fuel rail cup, the method comprising:

tumbling the metallic fuel rail cup with media to decrease surface roughness of an entrance to the cavity from a first surface roughness to a second surface roughness that is less than the first surface roughness, the decrease in surface roughness changing a sliding force of the elastomeric member with respect to the metallic fuel rail cup from a first force to a second force that is less than the first force.

13. The method of claim 12, wherein the tumbling includes tumbling a number of metallic fuel rail cups that is about three times greater than that of the media.

14. The method of claim 13, wherein the number of metallic fuel rail cups is about 15,000 and a number of the media is about 5,000.

15. The method of claim 12, wherein the metallic fuel rail cup is tumbled for about one hour.

16. The method of claim 12, wherein the media comprises generally cylindrical pieces having ends angled at about 45 degrees.

17. The method of claim 16, wherein the media are about 0.25 inches long.

18. The method of claim 17, wherein the media are about 3 millimeters in diameter.

19. The method of claim 18, wherein the media are made of steel and the metallic fuel rail cup is made of steel.

20. The method of claim 12, wherein the surface roughness is decreased from about 0.85 Ra micrometers to about 0.2 Ra micrometers.

21. The method of claim 12, wherein the elastomeric member comprises an O-ring providing a fuel impermeable coupling between the metallic fuel rail cup and fuel injector.

22. A method comprising:
  tumbling a fuel rail cup and media, the fuel rail cup including a surface defining an entrance to a cavity, and the media changing roughness of the surface from a first surface roughness to a second surface roughness that is less than the first surface roughness; and
  applying a force to insert a fuel injector into the cavity, the decreasing of the roughness changing opposition to the force from a first opposing force to a second opposing force, and the applying of a force to insert the fuel injector provides a fuel impermeable coupling between the fuel rail cup and the fuel injector.

* * * * *